April 28, 1964  G. GOODPASTURE  3,130,745
IRRIGATION PIPE MOVING SYSTEM
Filed Aug. 1, 1962  2 Sheets-Sheet 1
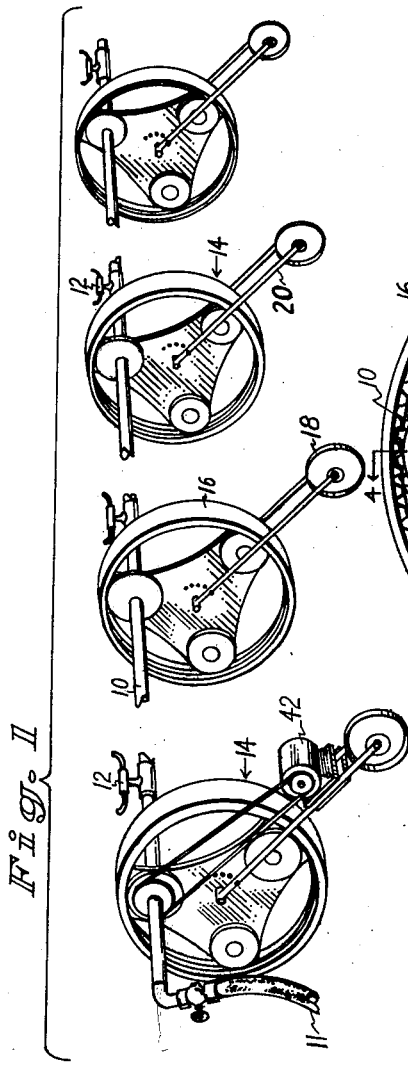
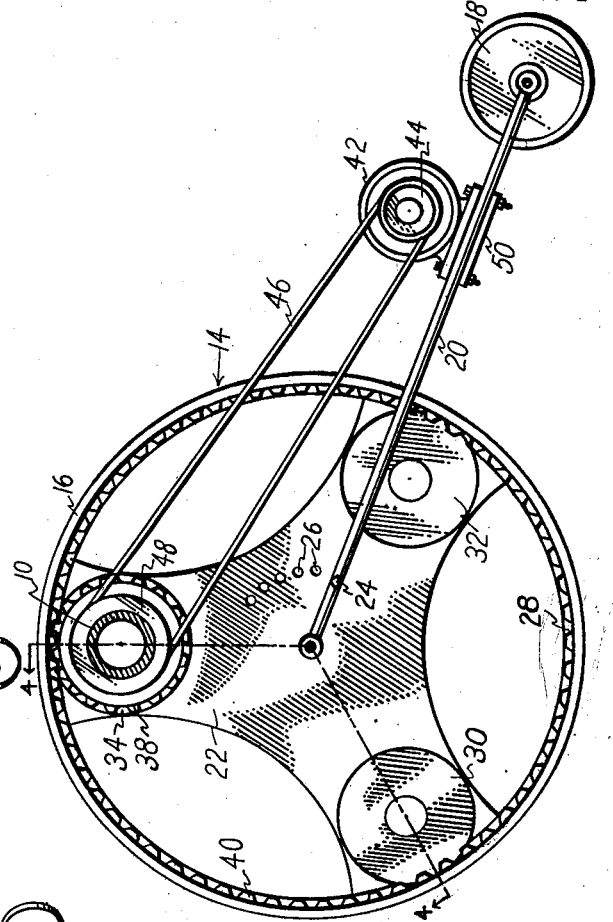
GRADY GOODPASTURE
INVENTOR.

April 28, 1964  G. GOODPASTURE  3,130,745
IRRIGATION PIPE MOVING SYSTEM
Filed Aug. 1, 1962  2 Sheets-Sheet 2

GRADY GOODPASTURE
INVENTOR.
BY

United States Patent Office 3,130,745
Patented Apr. 28, 1964

3,130,745
IRRIGATION PIPE MOVING SYSTEM
Grady Goodpasture, P.O. Box 912, Brownfield, Tex.
Filed Aug. 1, 1962, Ser. No. 213,931
4 Claims. (Cl. 137—344)

This invention relates to moving agricultural irrigation systems and more particularly to a system wherein the pipe is moved normal to its longitudinal axis.

Many systems have been suggested for moving agricultural irrigation pipe, e.g., Cornelius U.S. Patent Number 2,582,416. However, with such a system it is difficult to maintain the vehicles in alignment and also it exerts excess torque upon the pipe. Some systems eliminate the excessive torque upon the irrigation pipe by using an auxiliary shaft, e.g., Bevill, U.S. Patent Number 959,914.

I have invented a system whereby the irrigation pipe itself is the torque transmitting element from one vehicle to the other; however, I have eliminated the excess stress upon the irrigation pipe by having it rotate at a higher angular velocity than the vehicle wheel drives. In addition to this, I have made the irrigation pipe adjustable in height so that it may normally be kept as low as possible to avoid excess exposure to winds; however, it may be adjusted higher to raise it above tall crops.

An object of this invention is to provide a system for moving agricultural irrigation pipe.

Another object of this invention is to provide such a system wherein the pipe may be adjustable in height.

Still another object is to provide a system wherein the irrigation pipe itself is the power transmitting member from one vehicle to the next, yet excessive stress is not placed upon the irrigation pipe.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a perspective view showing a system according to my invention.

FIG. 2 is an elevational view showing one vehicle.

Figure 3:
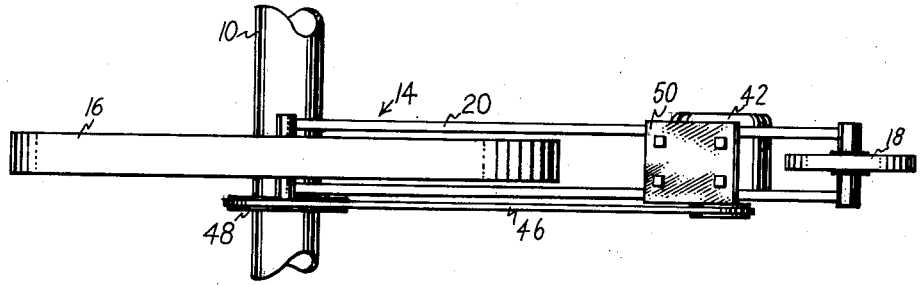
FIG. 3 is a bottom plan view showing one vehicle.

As may be seen in the accompanying drawings, the purpose of the invention is to move irrigation pipe 10. The pipe 10 is adapted to be connected to a source of water under pressure (not shown) by flexible connector 11. The water is discharged from the pipe 10 through the sprinklers 12. The sprinklers 12 are means for sprinkling water from the pipe 10. The pipe 10 is moved from one location to another by vehicles 14.

Each vehicle has a large rim or wheel 16 and a small wheel 18. The rim 16 and the wheel 18 have parallel axes. The wheel 18 is journaled for rotation to one end of frame 20. The other end of frame 20 is pivoted about the axis of spider or disc 22. The spider 22 is concentric with rim 16 and the rim 16 is mounted for rotation on the spider 22 by elements more fully described later. The position of the frame 20 to the spider 22 is fixed by bolt 24 passing through the frame 20 and through one of a plurality of holes 26 in the spider 22.

Figure 4:
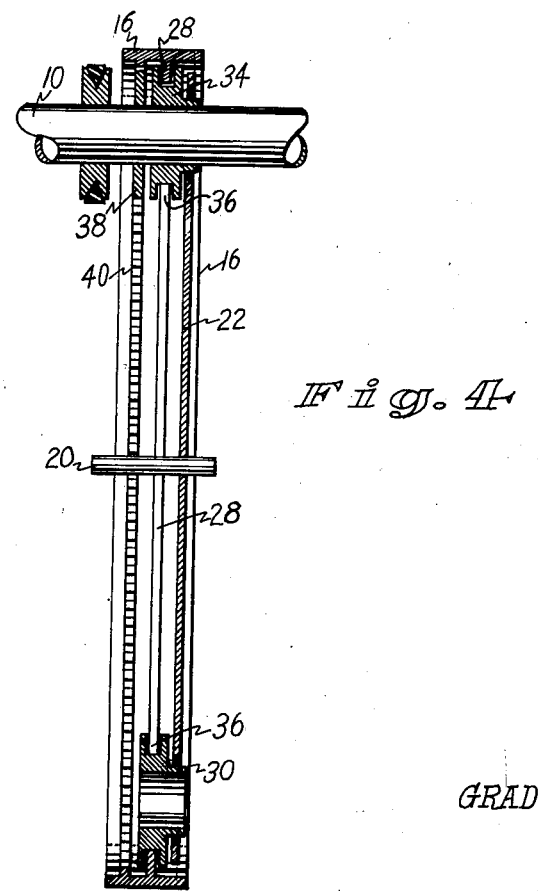
FIG. 4 is a sectional view taken on line 4—4 of FIG. 2.

As seen in FIG. 4 the rim 16 has inward turned flange 28, concentric to the rim 16. Three rollers 30, 32, and 34 are mounted along the perimeter of the spider 22. The rollers 30 and 32 are mounted for free rotation and are to maintain with the roller 34, the spider 22 positioned to the rim 16.

Each roller 30, 32, and 34 has a groove 36 in the center of its perimeter. These grooves 36 mate with flange 28 to prevent axial displacement of the spider 22 within the rim 16.

Each roller 34 is securely attached to and concentric with the pipe 10. Pinion 38 is securely attached to and concentric with the pipe 10. The teeth of the pinion 38 mesh with gear 40 which is attached to the rim 16. In practice I have found an economical way to construct the gear 40 is to weld a chain along the inside of the rim 16.

It may be seen that I have provided a mechanical transmission means for rotating the rim 16 from the pipe 10 at a slower angular velocity than the pipe 10. Therefore, since the pipe 10 has a higher angular velocity than the rim 16 the torque or stress on the pipe 10 is less than the stress on the pipe 10 would be if it rotated at the same angular velocity as the rim 16 and yet furnished power to rotate the rim 16.

Means for rotating the pipe 10 is provided. As illustrated this is in the form of motor 42 located upon the frame 20 of one of the vehicles 14. The motor 42 has as a part thereof pulley 44 which by belt 46 drives pulley 48 which is concentric with and securely attached to pipe 10. The motor 42 is connected to the frame 20 by bolts extending through its base and through plate 50. The motor base and plate 50 are on either side of the frame 20. Therefore the motor 42 may be adjusted along the frame 20 so that the belt 46 is at proper tension regardless of the angular adjustment of frame 20 and spider 22.

The motor 42 has been illustrated as an electric motor; however, it will be understood that other type motors could be used, such as an internal combustion or hydraulic motor. Also, it will be understood that it is not necessary to use a motor, but other means such as a hand crank or a cable e.g., Vernon, U.S. Patent Number 2,707,130, could be used for rotating the pipe 10.

In operation the pipe 10 is disconnected from the connector 11 before the system is moved from one location to the other. Thereafter the pipe 10 is rotated until the pipe 10 is located at the next location to be watered. The pipe 10 is stopped with the sprinklers 12 in the erect position. Then the connector 11 is reconnected and water is turned into pipe 10 again and the land irrigated.

It will be apparent that the embodiment shown is only exemplary and that various modifications can be made in construction, materials, and arrangement within the scope of the invention as defined in the appended claims.

I claim as my invention:
1. An agricultural irrigation pipe moving system comprising:
    (a) an elongated pipe adapted to carry sprinklers for sprinkling water therefrom,
    (b) a plurality of vehicles,
    (c) each vehicle including at least a rim and a wheel,
    (d) a spider mounted for rotation relative to each of said rims,
    (e) a frame interconnecting the spider and wheel of each vehicle,
    (f) means for attaching said frame in one of a plurality of positions to said spider,
    (g) said pipe mounted for rotation in said spiders,
    (h) a gear mounted on each of the rims,
    (i) a pinion smaller than said gear mounted on said pipe at each vehicle,
    (j) the teeth of each pinion meshed with the teeth of one of the gears, and
    (k) means for rotating said pipe, whereby the torque in the elongated pipe between the means for rotating and the vehicles is reduced inasmuch as the pinion on the pipe is smaller than the gear on the rim.

2. An agricultural irrigation pipe moving system comprising:
 (a) an elongated element,
 (b) a plurality of vehicles,
 (c) each vehicle having a frame,
 (d) a wheel mounted for rotation on each frame,
 (e) a spider for each vehicle,
 (f) each spider pivoted to its frame,
 (g) means for fixing the angular position of each spider and frame in one of a plurality of positions,
 (h) a rim mounted for rotation on each spider,
 (i) said rim encircling said spider,
 (j) said elongated element eccentrically mounted for rotation in said spiders,
 (k) mechanical transmission means for rotating each of said rims responsive to rotation of said elongated element at a slower angular velocity than said elongated element, and
 (l) means for rotating said elongated element, whereby the torque on the elongated element between the means for rotating and the plurality of vehicles is reduced inasmuch as it rotates faster than said rim.

3. In an irrigation agriculture pipe moving system having
 (a) an elongated pipe,
 (b) means for rotating said pipe,
 (c) said elongated pipe adapted to carry sprinklers for sprinkling water therefrom,
 (d) a plurality of vehicles attached to said pipe, and
 (e) each vehicle having at least one wheel; the improvement comprising in combination:
 (f) mechanical transmission means for rotating said wheels from said pipe at a slower angular velocity than said pipe, whereby the torque in the pipe between the means for rotating and the plurality of vehicles is reduced inasmuch as the pipe rotates faster than said wheel.

4. In an irrigation agriculture pipe moving system having
 (a) an elongated pipe,
 (b) means for rotating said pipe,
 (c) means for connecting said pipe to a source of water under pressure,
 (d) a plurality of vehicles attached to said pipe, and
 (e) each vehicle having at least one wheel; the improvement comprising:
 (f) mechanical transmission means for rotating said wheels responsive to rotation of said pipe at a slower angular velocity than said pipe, whereby the torque in the pipe between the means for rotating and the plurality of vehicles is reduced inasmuch as the pipe rotates faster than said wheels.

References Cited in the file of this patent
UNITED STATES PATENTS

| | | |
|---|---|---|
| 959,914 | Bevill | May 31, 1910 |
| 1,302,638 | Daniels | May 6, 1919 |
| 2,582,416 | Cornelius | Jan. 15, 1952 |
| 2,670,052 | Craver | Feb. 23, 1954 |
| 2,892,466 | Stilwell et al. | June 30, 1959 |
| 2,940,672 | Gaskell | June 14, 1960 |
| 2,946,515 | Jensen | July 26, 1960 |